Nov. 26, 1957 A. G. JIRAK 2,814,377
CONVEYOR ATTACHMENT FOR ELEVATING MACHINERY
Filed June 29, 1953 2 Sheets-Sheet 1

Witness
Edward P. Seeley

Inventor
Albert G. Jirak
by Talbert Dick & Adler
Attorneys

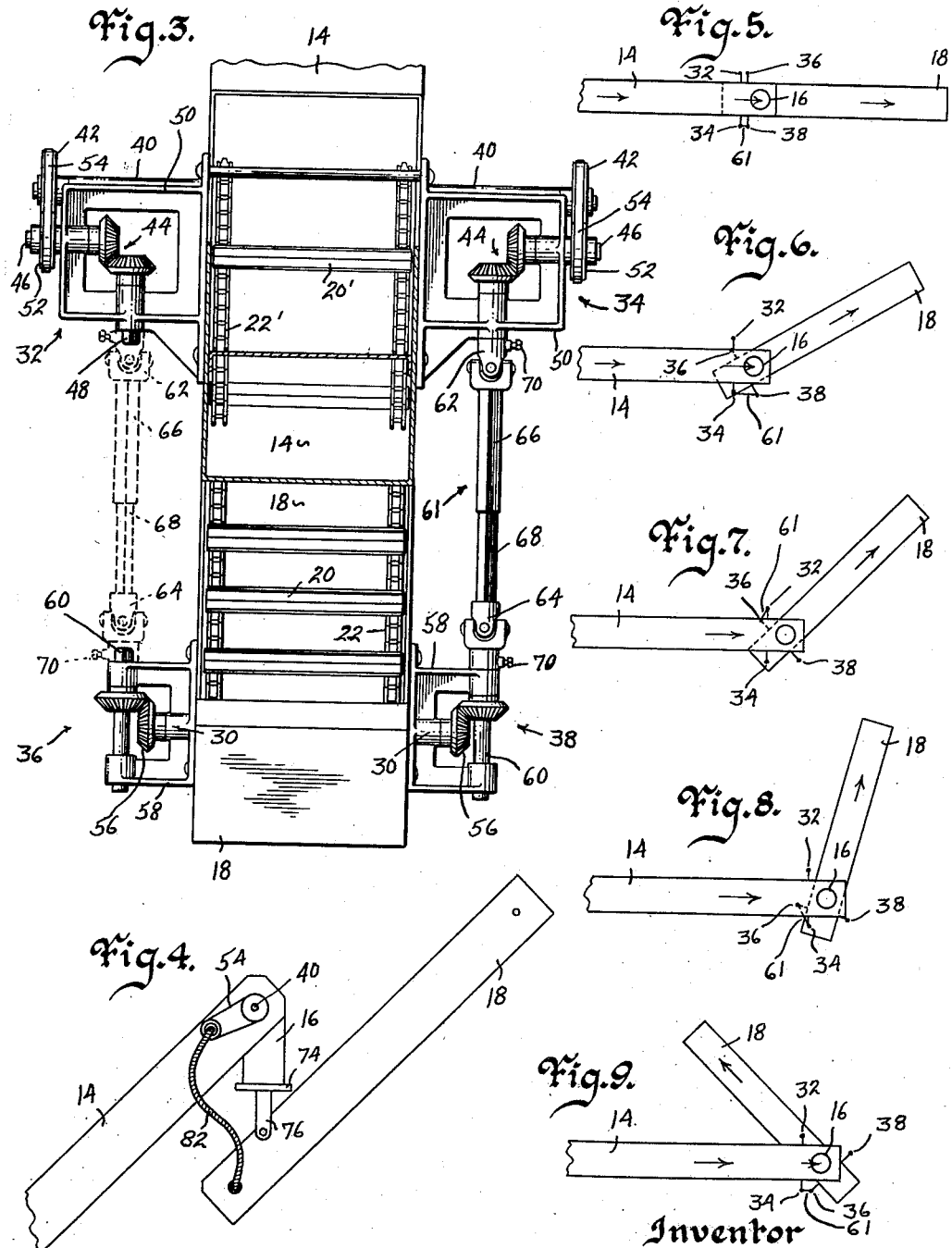

United States Patent Office 2,814,377
Patented Nov. 26, 1957

2,814,377

CONVEYOR ATTACHMENT FOR ELEVATING MACHINERY

Albert G. Jirak, Fort Atkinson, Iowa

Application June 29, 1953, Serial No. 364,727

3 Claims. (Cl. 198—100)

My invention relates to improvements in elevating machinery and is particularly adapted for use with grain and the like although it is not intended that it be particularly limited thereto.

After grain is harvested, for example, it is frequently placed in a storage house or bin and this is usually accomplished by delivering it from ground level by conveyor to and through the top or roof of the bin where it falls through a spout that may be swivelled so as to distribute it about the storage area. Such a procedure is common and it has been observed that because the spout must necessarily extend downwardly into the bin for a gravity feed and because it must be long enough so as not to spill the grain in one general area when swivelled, a limit of the height to which the bin can be filled is determined by the plane of the discharge end of the spout which is obviously considerably below the top of the bin so that a substantial storage area in the upper portion of the bin or house is not utilized.

The advantages and economy in being able to use all the upper area in storage bins now not being availed of is obvious and it is with such a thought in mind that I have provided an improvement for the elevating machinery to accomplish this objective.

More particularly in this respect I have replaced the customary discharge spout at the end of the elevator with a conveyor means which is vertically movable so as to raise the point of discharge of the grain within the bin and which is rotatable to allow distribution thereof throughout the storage area.

Another object of this invention is to provide a conveyor for elevating machinery as above indicated which is operatively connected to the same source of power as the main elevator.

A still further object of this invention is to provide means for connecting the conveyor to the elevator whereby variations in speed of the conveyor are possible and a rotation of the conveyor to a full three hundred and sixty (360) degrees is possible.

These and other objects will be apparent to those skilled in the art.

Figure 1:
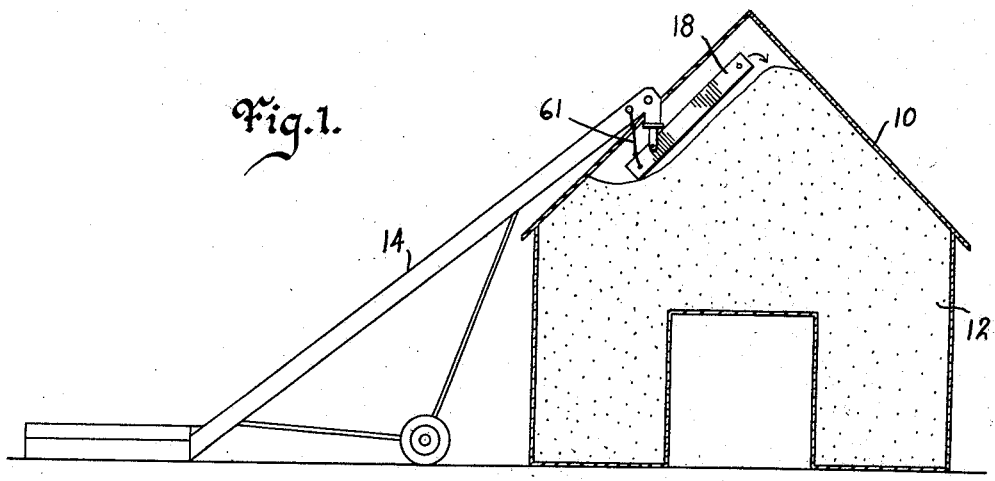
Figure 2:
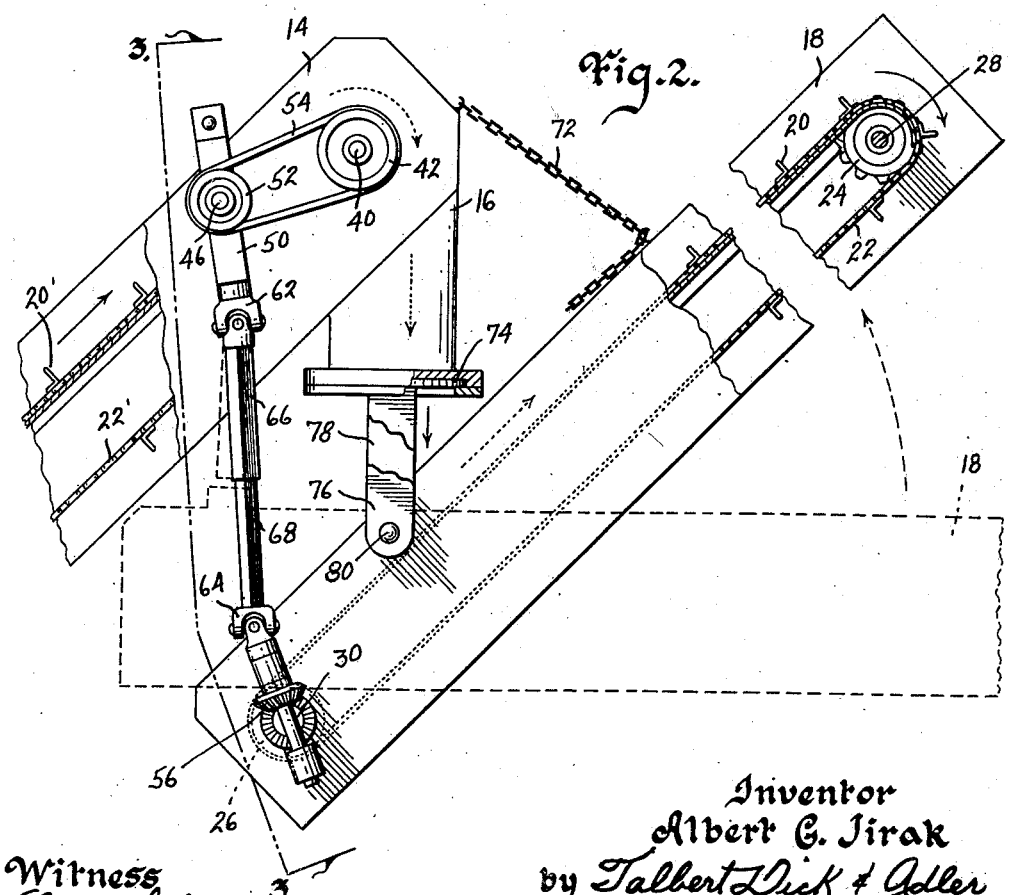

My invention consists in the construction, arrangement, and combination of the various parts of the device, whereby the objects contemplated are attained as hereinafter more fully set forth, and specifically pointed out in my claims, and illustrated in the accompanying drawings, in which:

Fig. 1 is an elevational diagrammatic view illustrating the use of my invention in a grain storage bin, Fig. 2 is an enlarged side view showing my conveyor and its attachment to a regular elevator, with portions cut away to more fully illustrate its construction and with broken lines to indicate positions of movement of the conveyor relative to the elevator, Fig. 3 illustrates more particularly the arrangement and construction of this invention and is taken from the line 3—3 of Fig. 2, Fig. 4 is a diagrammatic view of this invention illustrating a modified means for connecting the conveyor to the elevating machinery, and Figs. 5 to 9 inclusive are each diagrammatic views to illustrate various positions of the conveyor relative to the elevator and to show some of the arrangements for my telescoping shaft which makes possible the rotation of the conveyor for a complete three hundred and sixty (360) degrees.

Referring to the drawings the diagrammatic illustration in Fig. 1 shows a grain storage bin 10 into which grain 12 is delivered by means of any suitable elevating mechanism 14 (usually portable) to a head section 16 that depends through an opening in the roof of the bin. No invention is claimed for such structures or arrangements since it is commonly used and is well known in the art. However, present structures of this type employ a discharge or delivery spout that extends downwardly into the bin from the head section 16. Such spouts are designed for gravity feed and obviously their discharge end will be considerably below the head section 16 which will of necessity limit the height to which the bin can be filled, as previously pointed out. In my invention I have eliminated the use of such a spout and have associated with the elevator 14 a conveyor 18 of any suitable kind that is mounted as will later appear so as to be capable of discharging grain 12 into bin 10 at a point closely adjacent the ceiling thereof (Fig. 1). It should be pointed out that while I have used the terms elevator and conveyor to distinguish between members 14 and 18, the conveyor 18 is in effect an elevating mechanism that may be and preferably is constructed the same as elevator 14. No invention is claimed for the construction of either member 14 or 18 per se but only in their arrangement and cooperative operation as will later appear. It will be observed that member 18 is formed in a well known manner which includes a plurality of spaced flights 20 carried by the endless chain 22 that moves on sprockets 24 and 26 at the forward and rearward ends respectively of member 18 and which sprockets 24 and 26 are mounted respectively on the shafts 28 and 30. Member 14 is similarly constructed as member 18 and like parts carry like numbers primed to the extent that they are illustrated for purposes of disclosing my invention.

In general, my invention embodies the use of a conveyor or elevator 18 as an adjustable and maneuverable extension of the portable elevator unit 14 together with novel means for operating member 18 from the same source of power as that used to operate member 14 which is shown more particularly in Figs. 2 and 3 and which I will now describe. With reference now to Fig. 3 it will be observed that I show a gear arrangement or assembly at each side of the forward end of elevator 14 and for purposes of identification in subsequently describing their operation relative to Figs. 5–9 I have designated them generally by the respective numerals 32 and 34. Likewise separate gear assemblies have been placed at each side of the rearward portion of conveyor 18 and for the same reason these are designated generally by the numerals 36 and 38. The gear assemblies 34 and 38 for example at one side of this entire unit are sufficient to permit a limited movement of member 18 as will later appear but preferably I use the assemblies 32 and 36 to increase such limits. However, since gear units 32 and 34 are of like structure and the same is true of units 36 and 38 a description of one set only, namely 34 and 38 will be made here and like numbers will be used to designate like parts on the units 32 and 36.

A shaft extension 40 is provided for the forward shaft (not shown) on elevator 14 and on the free end thereof is mounted the pulley wheel 42. A pair of bevel gears 44 with intersecting axes operate the respective stub shafts 46 and 48 which are supported by a bracket means 50 that is suitably mounted to member 14. Shaft 46 is parallel to shaft extension 40 and carries the pulley wheel 52 connected to pulley 42 by a belt 54. Shaft 48 is, of course, perpendicular to shaft 46 and extends toward gear unit 38. A second set of bevel gears 56 with intersecting axes is mounted in a bracket means 58 that is secured to the rearward end of conveyor 18. One of the gears 56 is attached to shaft 30 and the other carries the shaft 60 which extends perpendicular to shaft 30 and toward gear unit 34.

The drive connection 61 between gear assemblies 34 and 38 must have flexibility to operate with conveyor 18 in various positions of adjustment relative to elevator 14 and for this purpose I provide two universal joints 62 and 64 that are detachably connected respectively to shafts 48 and 60 and an elongated socket 66 that extends from joint 62 to receive the telescoping square or splined shaft 68 secured to joint 64. A set screw 70 on each universal joint provides a simple and quick means for removing the drive connection 61 so that it may be employed between gear units 32 and 36 (Fig. 3) or in other combinations as will later appear (Figs. 5-9). A suitable chain or the like 72 extends between the forward end of elevator 14 and forward portion of conveyor 18 to hold member 18 in different positions of vertical movement.

It will be understood that grain moving on elevator 14 will fall through the head section 16 onto conveyor 18 and thus to keep member 18 in proper alignment to receive this grain I have removably attached a rotatable collar or spout ring 74 to the bottom of head section 16. This ring carries a pair of oppositely disposed bracket arms 76 and 78 that depend therefrom and the free end of each arm is pivotally secured respectively to opposite sides of member 18 by a pin or the like 80 and at a point intermediate the longitudinal center and rear of member 18 (Fig. 2).

In operation, the chain 22 on member 18 will be moved from power operating elevator 14 because of drive connection 61 between the gear units 34 and 38 and preferably I suggest that pulley 42 be of a size calculated to move chain 22 on member 18 at twice the speed as chain 22' on member 14. The use of gears and shafts to connect members 14 and 18 make possible such speed variations but it is pointed out that where such variation may not be used, power can be transferred from member 14 to member 18 by means of a flexible cable 82 such as illustrated in Fig. 4.

It will be appreciated from the foregoing description that while conveyor 18 is in effect an extension of the elevator 14, the forward end or discharge point on member 18 can be in longitudinal alignment with member 14 or can be moved laterally relative to the forward end of member 14 and in either position can be moved vertically relative thereto. When moved vertically, member 18 pivots on pin 80 and drive 61 will telescope outwardly or inwardly as may be required and as illustrated in Fig. 2. Likewise drive 61 will telescope as member 18 may be rotated and in this connection there will obviously be a limit of the flexibility of drive 61 between any two gear assemblies so that any one position of drive 61 will limit the arc through which member 18 can swing. For this reason I have provided the gear units 32 and 36 on one side of my over-all structure which are a duplication of the gear units 34 and 38 on the other as above mentioned. Having two such sets of gear units merely increases the arc through which member 18 will swing which is accomplished as required by repositioning drive connection 61. To illustrate some forms of this repositioning, the gear units 32, 34, 36 and 38 are identified in the diagrammatic drawings of Figs. 5-9 and the point of connection of drive 61 is also identified. In any position of movement, however, the rearward portion of conveyor 18 will be maintained by ring 74 and arms 76 and 78 in proper alignment with head section 16 to receive grain therefrom. It should be pointed out that while I have preferably used elevators of the type employing cross flights on endless chains to illustrate my invention, other types of elevators and conveyors may be employed without departing from the principles disclosed.

With my conveyor attachment 18 to a conventional elevator 14 it is now possible to deliver grain practically to the ceiling of a bin 10 and at the same time to spread it over a relatively wide area. It will also be understood that by the very nature of the purpose of this invention, conveyor 18 is easily detachable from elevator 14 so that it can be mounted to the same from the inside of a storage bin 10 to be positioned as shown in Fig. 1. This operation involves only the three points of attachment represented by chain 72 to the forward end of elevator 14, ring 74 to head section 16 and the flexible drive 61 which is attached and detached by manipulation by set screws 70.

It is submitted that the invention shown and described is aptly suited to achieve the purposes intended and is characterized by a combination of highly useful and mutually cooperating elements that combine their respective and proportionate functions in accomplishing the objects sought to be obtained.

Some changes may be made in the construction and arrangement of my conveyor attachment for elevating machinery without departing from the real spirit and purpose of my invention, and it is my intention to cover by my claims, any modified forms of structure or use of mechanical equivalents which may be reasonably included within their scope.

I claim:

1. In combination, an elevator assembly for grain or the like having a receiving end and a discharge end, a rotatable shaft in said discharge end as a part of the elevator assembly, a shaft extension on said rotatable shaft, a pulley on said shaft extension, a bracket on said elevator assembly, a pair of bevel gears carried by said bracket, a first stub shaft parallel to said shaft extension and operatively connected to one of said bevel gears, a pulley on said shaft, a drive belt connecting said pulleys, a second stub shaft operatively connected to the other bevel gear and disposed perpendicularly to said first stub shaft, a conveyor spaced below and rotatably detachably connected to the discharge end of said elevating assembly so as to intercept grain discharged therefrom, a rotatable shaft at one end of said conveyor as a part of the conveyor assembly, a bracket on said conveyor, a pair of bevel gears carried by said bracket, one of said bevel gears connected to the shaft on said conveyor, a third stub shaft operable by the other of said bevel gears, a flexible drive means detachably connected to said second and third stub shafts, said flexible drive comprising a pair of universal joints attachable respectively to said second and third stub shafts, a socket extending from one universal joint, a square shaft extending from the other universal joint and adapted to telescope within said socket, and said elevating assembly designed to be attached to a source of power.

2. In combination, an elevator assembly for grain or the like having a receiving end and a discharge end, a rotatable shaft in said discharge end as a part of the elevator assembly, a shaft extension on said rotatable shaft, a pulley on said shaft extension, a bracket on said elevator assembly, a pair of bevel gears carried by said bracket, a first stub shaft parallel to said shaft extension and operably connected to one of said bevel gears, a pulley on said shaft, a drive belt connecting said pulleys, a second stub shaft operatively connected to the other bevel gear and disposed perpendicularly to said first stub shaft, a head section on the discharge end of said elevator assembly, a collar rotatably detachably mounted on said head section, a pair of arms oppositely disposed on and depending from said collar, a conveyor extending between and supported by said arms so as to be vertically tiltable therebetween and rotatable with said collar, said conveyor position so as to intercept material from said head section, a rotatable shaft at one end of said conveyor as a part of the conveyor assembly, a bracket on said conveyor, a pair of bevel gears carried by said bracket, one of said bevel gears connected to the shaft on said conveyor, a third stub shaft operable by the other of said bevel gears, a flexible drive means detachably connected to said second and third stub shafts, said flexible drive comprising a pair of universal joints attachable respectively to said second and third stub shafts, a socket extending from one universal joint, a square shaft extending from the other universal joint and adapted to telescope within said socket, and said elevating assembly designated to be attached to a source of power.

3. Elevating machinery for moving grain or the like from a point outside of a bin to a discharge point within and substantially at the top of such bin, comprising in combination with a storage bin, elevating means located outside of said bin and having a discharge end positioned to register with an opening in said bin, a head section on said discharge end depending therefrom through said opening in said bin to the interior thereof, a conveyor having a receiving and discharge end respectively, said discharge end spaced below and rotatably detachably connected to said head section so as to intercept grain from said elevating means, the discharge end of said conveyor disposed within said bin near the top thereof at a point higher than said head section, and means to transmit power from said elevating means to said conveyor.

References Cited in the file of this patent

UNITED STATES PATENTS

| | | | |
|---|---|---|---|
| 10,208 | Reeves | Sept. 26, | 1882 |
| 275,941 | Perkinson | Apr. 17, | 1883 |
| 771,746 | Peters | Oct. 4, | 1904 |
| 880,826 | Reistad | Mar. 3, | 1908 |
| 1,117,619 | Adams | Nov. 17, | 1914 |
| 1,818,168 | Smith | Aug. 11, | 1931 |
| 2,360,069 | Marvin | Oct. 10, | 1944 |
| 2,422,268 | Symonds | June 17, | 1947 |
| 2,648,422 | Kling | Aug. 11, | 1953 |